Oct. 13, 1942.　　　A. F. HOWE　　　2,299,019
MECHANISM FOR FORMING CONCRETE SLABS
Filed Feb. 11, 1939　　　5 Sheets-Sheet 1

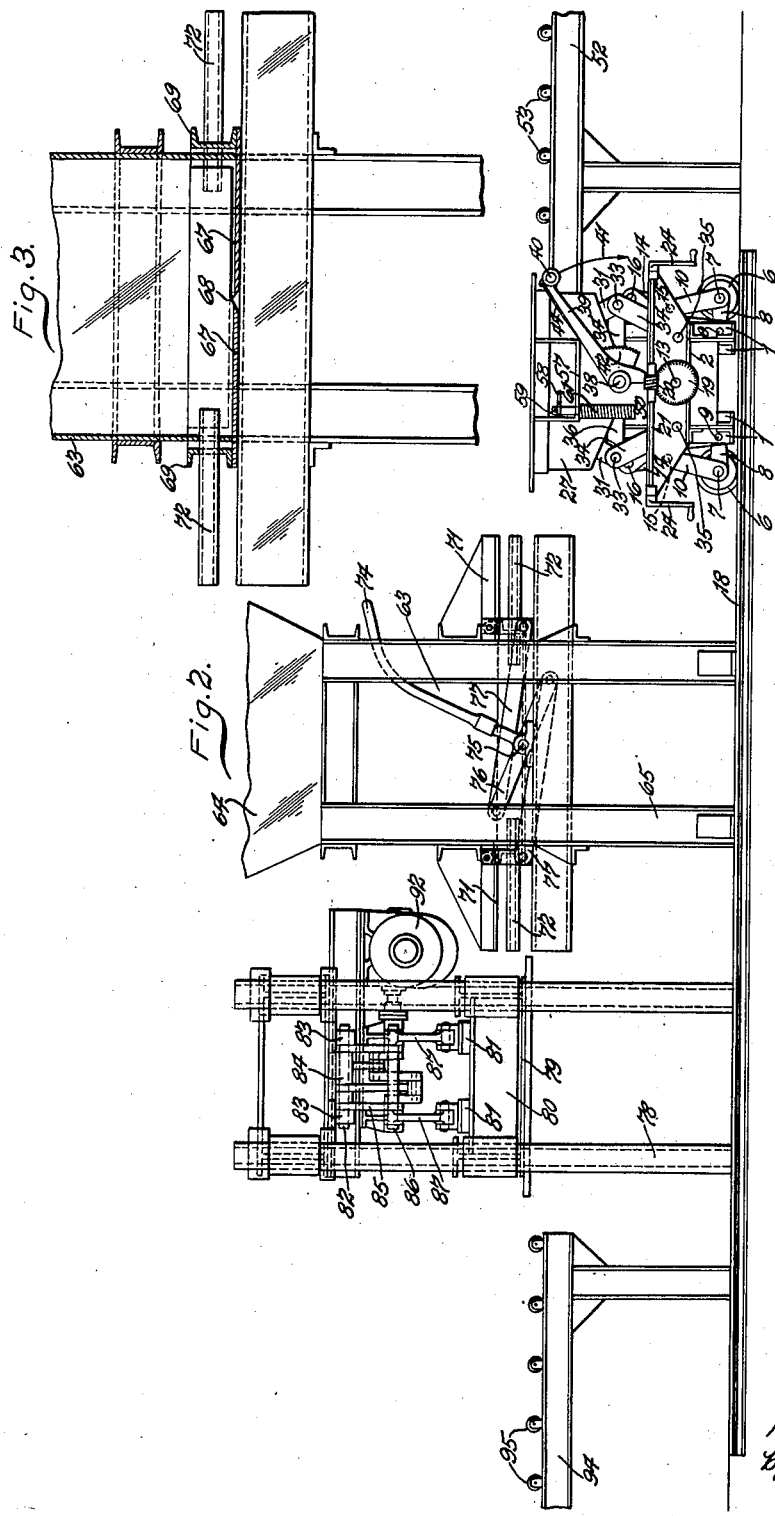

Oct. 13, 1942.   A. F. HOWE   2,299,019
MECHANISM FOR FORMING CONCRETE SLABS
Filed Feb. 11, 1939   5 Sheets-Sheet 3

Inventor
Andrew F. Howe
by Rippey & Cassidy
His Attorneys.

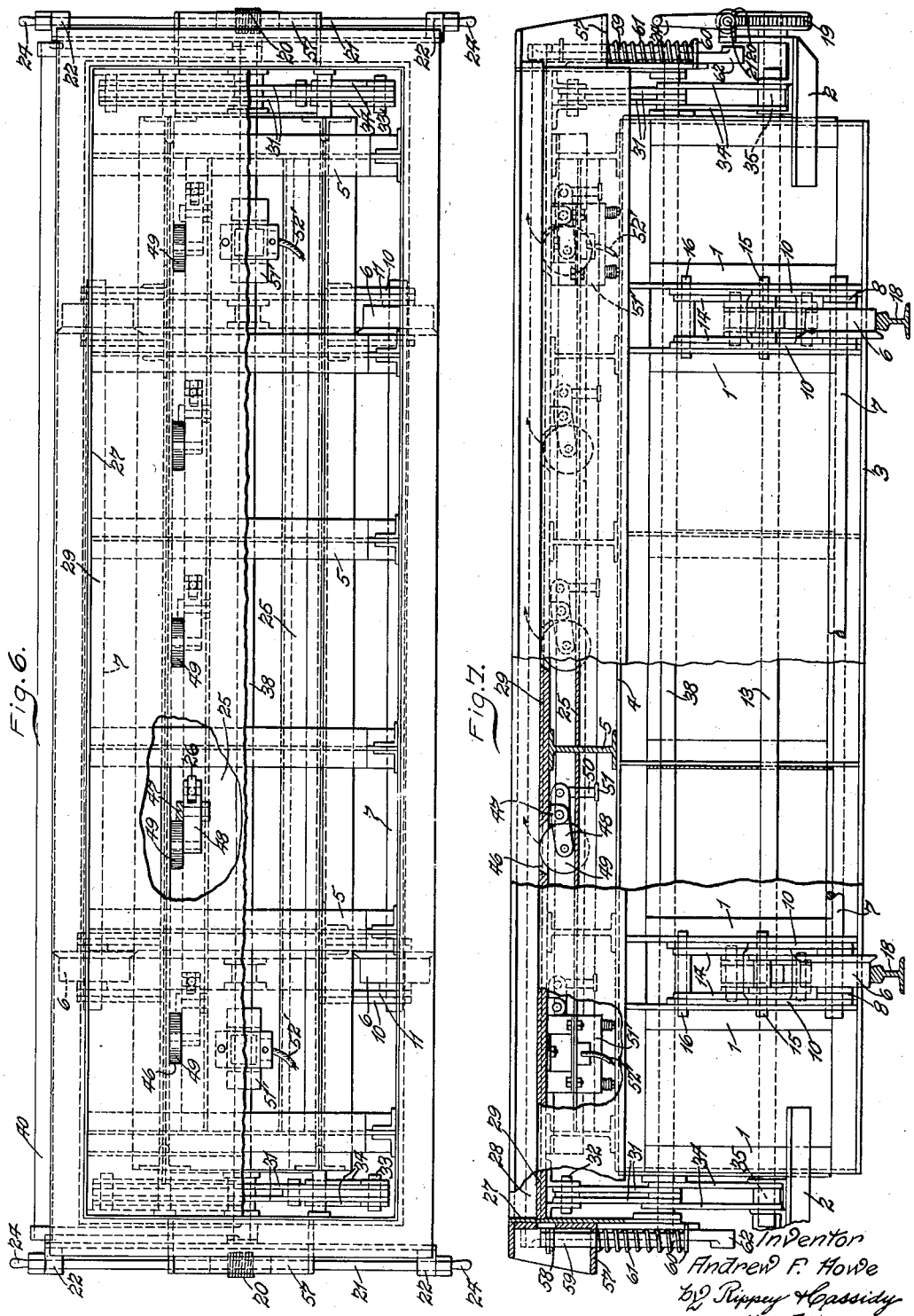

Oct. 13, 1942.   A. F. HOWE   2,299,019
MECHANISM FOR FORMING CONCRETE SLABS
Filed Feb. 11, 1939   5 Sheets-Sheet 5

Inventor
Andrew F. Howe
by Rippey & Cassidy
His Attorneys

Patented Oct. 13, 1942

2,299,019

UNITED STATES PATENT OFFICE 2,299,019

MECHANISM FOR FORMING CONCRETE SLABS

Andrew F. Howe, University City, Mo.

Application February 11, 1939, Serial No. 255,821

8 Claims. (Cl. 25—42)

This invention relates to mechanism and method for forming slabs; and has special reference to mechanism and method for forming slabs composed of solidified plastic material, such as concrete.

Objects of the invention are to provide an improved mechanism and method for forming slabs of concrete or other plastic material, comprising a movable carriage supporting a form or mold adapted to receive said material and to shape the same; to provide means for guiding the carriage in its movements from the position in which it receives said material to position in which the material is treated to render the same of approximately uniform consistency and density throughout and pressed preparatory for hardening; to provide a pallet adapted to be inserted in and removed from the form or mold for receiving and supporting the plastic material or concrete; and to provide means for facilitating the placing of the pallet in the form or mold, supporting the pallet therein, and ejecting the pallet with the formed slab from the form or mold.

Another object of the invention is to provide equipment for the carriage comprising a truck having wheels for supporting and guiding the carriage in its movements, rigid frame structure included in the truck, and mechanism for raising the wheels out of engagement with the track upon which they operate and causing said frame structure to support the truck rigidly in the positions in which rigid location of the truck is desired.

Another object of the invention is to provide improved mechanism for displacing the form or mold from about the slab therein so as to permit the slab to be easily removed from the mold.

Another object of the invention is to provide an improved mechanism and method herein disclosed for forming reinforced concrete slabs by first partially filling a form or mold with concrete, then placing the reinforcement upon the concrete within the mold, then placing within the mold the additional amount of concrete desired to form the slab, and then distributing and compressing the concrete within the mold to the proper consistency and density during vibration of the mold to cause the concrete to flow freely during compression thereof.

Another object of the invention is to create mechanized methods for progressively producing slabs from plastic material such as concrete for use in forming boxes in a simplified manner that does not require skilled operatives, thus reducing the cost of production to a minimum.

Another object of the invention is to provide an improved mechanism and method for making reinforced concrete slabs adapted for use in forming burial boxes and other enclosures that will last indefinitely.

Other objects and advantages will appear from the following description, reference being made to the annexed drawings, in which—

Fig. 2 is a side elevation of the mechanism that is shown in Fig. 1, together with additional operating devices on the carriage.

Fig. 3 is an enlarged vertical sectional view of the lower portion of the chute through which the concrete is delivered into the form or mold.

Fig. 6 is an enlarged plan view of the carriage with a part of the bottom broken away and the operating mechanism omitted.

Fig. 7 is a side elevation of the carriage with a part of the side wall broken away and other parts shown in section.

Figure 1:
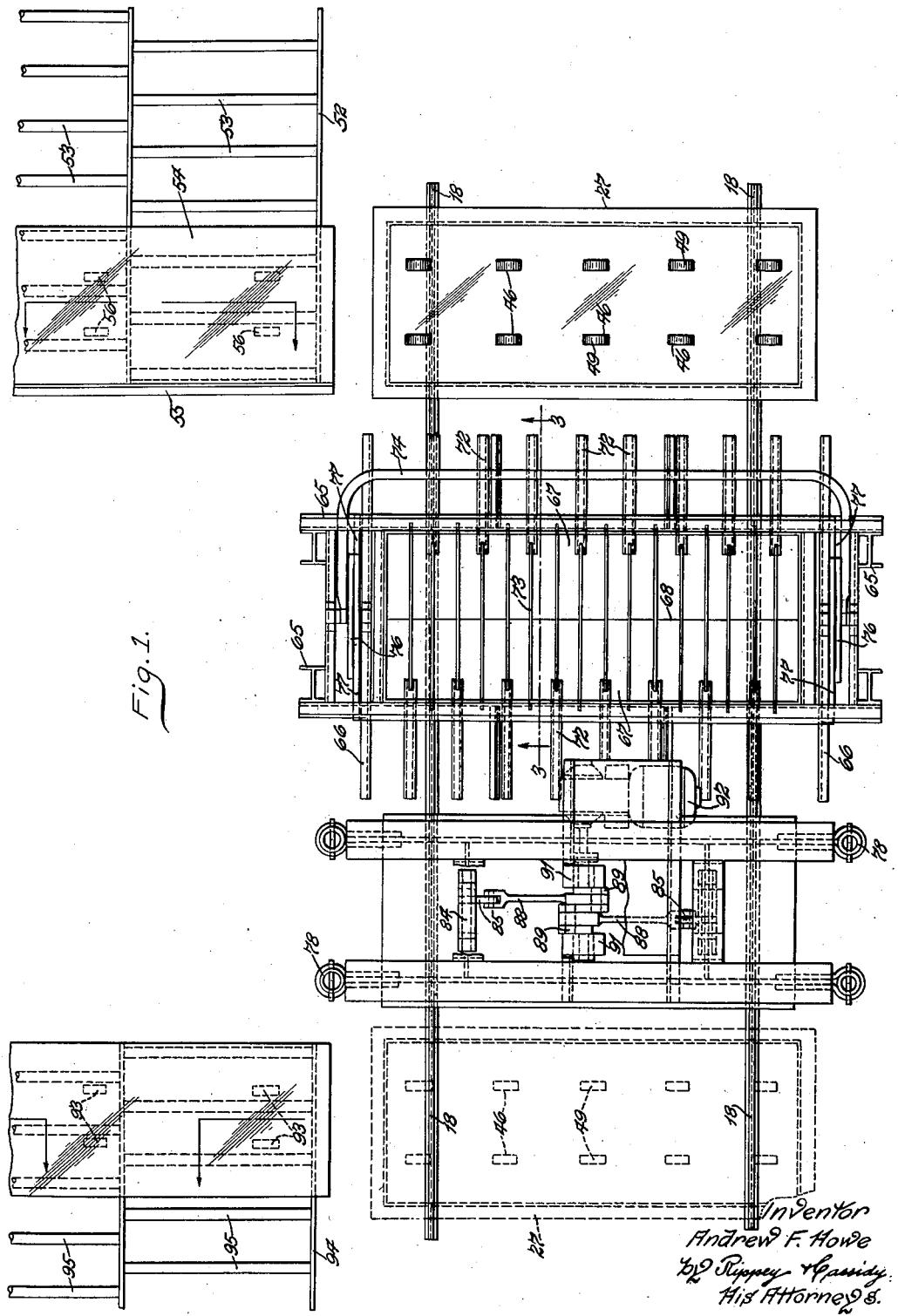
Fig. 1 is a plan view of my improved mechanism for forming slabs, a part of the operating devices mounted on the movable carriage being omitted.

The carriage, in the specific embodiment shown, comprises a frame of rigid construction including two upright members 1 near each corner (Fig. 5), angle bars 2 rigidly connecting the upright members 1 at adjacent corners of the frame, lower horizontal angle bars 3 rigidly connecting the members 1 at the respective sides of the frame, transverse horizontal angle bars 4 rigidly connecting the upper ends of the upright members 1, and a number of bars 5 rigidly attached to the upper sides of the bars 4.

Figure 4:
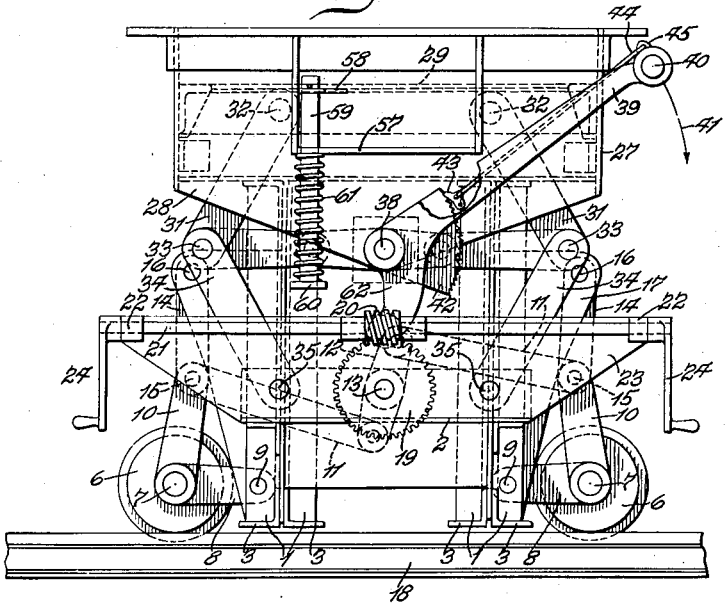
Fig. 4 is an end elevation of the carriage.
Figure 5:
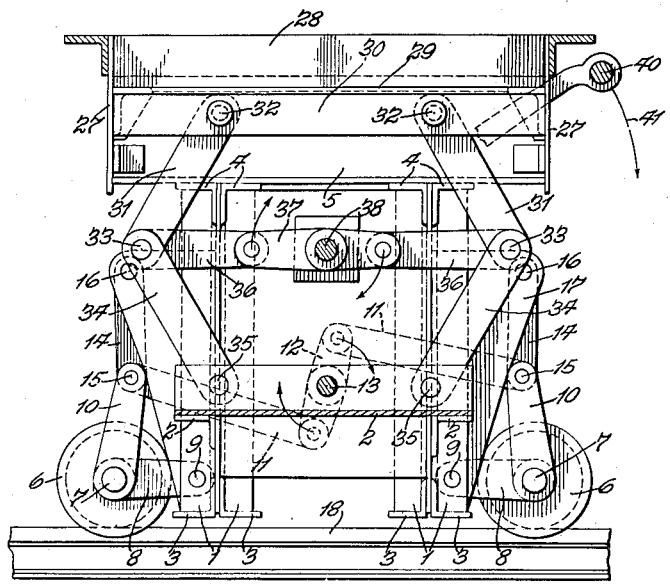
Fig. 5 is a vertical cross-sectional view of the carriage.

The wheels 6 are rotative on transverse axles 7. Arms 8 have their inner ends connected with the upright members 1 by pivots 9 and their outer ends rigidly engaging the axles 7. A number of arms 10 have their lower ends rigidly attached to the axles 7 and their upper ends pivotally connected with the outer ends of links 11, the inner ends of which are pivoted to the opposite ends of a lever 12 rigidly attached to a shaft 13 journalled for rocking movements in the transverse angle bars 2. There are two arms 8 and two arms 10 for each wheel. Links 14 have their lower ends connected with the pivots 15 and their upper ends mounted on pivots 16 supported by the rigid frame parts 17. As shown in Figs. 4 and 5, when the shaft 13 is rotated in a counter-clockwise direction, the toggle provided by the arms 10 and the links 14 will be broken, the wheels 6 will be raised from the rails 18, and the transverse frame members 3 will seat upon the rails and support the carriage rigidly and immovably thereon. And, when the shaft 13 is turned to the position shown (Figs. 4 and 5), the toggle formed by the arms 10 and links 14 will be extended, the wheels 6 will be lowered onto the rails 18, and the carriage frame raised above and out of engagement with said rails, thereby permitting the carriage to be moved along the track provided by these rails. A worm gear 19 is attached to one end of the shaft 13 and meshes with a worm 20 attached to a shaft 21 rotatively journalled in bearings 22 supported by a rigid frame part 23. Cranks 24 on the ends of the shaft 21 provide means for rotating said shaft 21, and thereby the shaft 13, to raise and lower the frame as described.

Plates or bars 25 are rigidly attached to the transverse bars 5 of the frame and have slots 26 therein. A pair of walls 27 at each end of the frame and walls 28 at each side of the frame connecting the ends of the walls 27 provide a rectangular oblong form or mold. These walls are rigidly connected and are also rigidly attached to the bars 5 constituting parts of the rigid carriage frame. A plate 29 is mounted for vertical movements within the form or mold and, in its lowermost position, seats upon the bars 5. Said plate 29 may be moved vertically within and with respect to the form or mold. Two transverse angle bars 30 are attached to the underside of the plate 29 near each end. A pair of toggle devices for moving the plate 29 vertically within the form or mold are provided at each side of the carriage. Each of these toggle devices comprises links 31 having their upper ends connected with pivots 32 mounted in the angle bars 30 and their lower ends connected by pivots 33 with the upper ends of links 34 which have their lower ends engaging pivots 35 (Fig. 5) supported by the angle bars 2. Links 36 have their outer ends connected with the pivots 33 and their inner ends pivoted to a lever 37 at opposite sides of a shaft 38 to which said lever 37 is rigidly secured.

The shaft 38 is mounted for rocking movements in rigid parts of the frame comprising the mold end plates 28. A bail constituting a crank is attached to opposite ends of the shaft 38 and comprises a pair of arms 39 having their outer ends connected by a rod 40. This bail crank constitutes means for turning the shaft 38 to operate the toggle devices described for raising and lowering the plate 29 within the form or mold while the latter remains stationary. As shown in Figs. 4 and 5, the plate 29 is in its lowermost position and is seated upon the bars 5. When the crank is moved downwardly, as indicated by the arrow 41 (Fig. 4), the toggles will be extended and the plate 29 will be moved upwardly within the form or mold to the position desired so that slabs of the desired thickness may be made. Near one end of the shaft 38 a ratchet segment 42 is rigidly attached to the frame and has its outer curved edge concentric with the axis of the shaft 38 and provided with ratchet teeth as shown. A pawl 43 is pivoted on the adjacent arm 39 for engagement with the ratchet segment 42, and is operative by a link 44 having its inner end pivoted to said pawl and its outer end pivoted to an operating device 45 of familiar construction mounted on the rod 40. Thus, when the crank device is moved downwardly in the direction of the arrow 41, the pawl 43 will escape along and over the teeth on the ratchet device 42 and, by engagement therewith, will support the plate 29 firmly in the position to which it is moved. Obviously, one of these ratchet devices may be provided at each side of the carriage to obtain proper rigidity.

Two rows of slots 46 are formed in the plate 29. Adjacent to each of these holes, a bracket 47 is rigidly secured to the underside of the plate 29 and a lever 48 is pivoted to each of said brackets. A roller 49 is rotatively supported by each lever 48 for projection through said slots 46. Said rollers 49 may be moved downwardly flush with or below the upper surface of the wall 29, or extended upwardly through the holes 46 so that their upper peripheral portions are above said plate 29. When the rollers 49 are extended above the plate 29, they are free to rotate. The opposite end of each lever 48 has pivoted thereto a link 50 which extends downwardly through the adjacent slot 26 and has on its lower end a head 51 larger than the width of said slot. Therefore, when the plate 29 is raised and rigidly supported in its raised position, the heads 51, by engagement with the plates or bars 25, will hold the rollers 49 extended above the plate 29. Obviously, these rollers 49 may be extended different distances beyond the plate 29, as determined by the adjustment of the toggle links 31 and 34. To flow the material and to compact and settle it within the mold during action of the press thereon, a conventional vibrator 51' energized through circuit wires 52' may be attached to the plate 29 to vibrate the same. It is known that the equipment of these vibrators causes pulsating waves with a time interval between them to produce effective vibration of the supporting carriage and mold, causing the material to flow and the press to operate effectively.

A conveyor device comprising a frame 52 and rollers 53 mounted therein may be located at the side of the starting position of the carriage. Pallets 54 may be moved individually and successively to position against an abutment 55 and in alignment with the form or mold on the carriage, so that the pallets may be moved laterally from said conveyor into the carriage, which movement is facilitated by rollers 56 in the frame 52 and the rollers 49 in the carriage. These pallets have the same lateral and longitudinal dimensions as the inside of the form or mold so that, when a pallet is in position therein, it forms the bottom of the form or mold upon which the concrete is placed preparatory for forming a slab. These slabs may be made of selected thicknesses by raising and lowering the rollers 49 to support the pallets at selected distances below the upper edge of the form or mold.

Each side wall 28 of the form or mold has rigid therewith a wall 57 and a flange 58 (Figs. 4 and 7). A rod 59 extends for vertical sliding movements through the wall 57 and the flange 58 at each side of the carriage. Said rods have heads 60 on their lower ends, and springs 61 encircle said rods between the heads 60 and the walls 57. Each arm 39 has an integral extension 62 at its inner end which, when said arms 39 are swung downwardly, engage against the heads 60 and thereby cause the springs 61 to push upwardly against the walls 57. Engagement of the extension 62 against the heads 60 occurs about the time that the toggles 31, 34 are straight, and further downward movement of the arms 39 is resisted and stopped. Then, when the pawls 43 are released from the ratchets 42, the springs 61 act to assist breaking of the toggles 31 to 34 to move the wall 29 downwardly.

Figure 8:
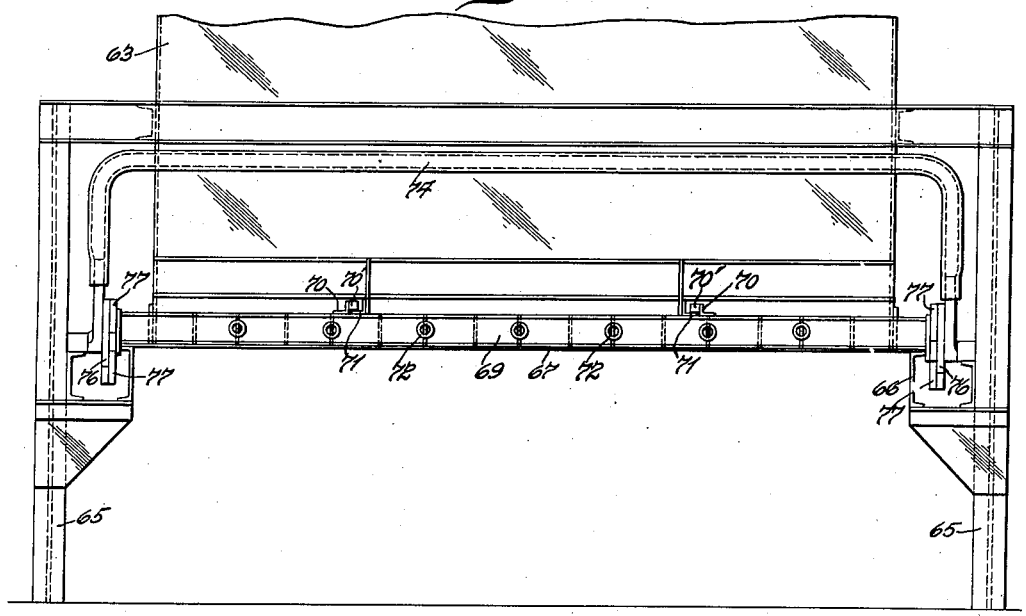
Fig. 8 is an enlarged elevation of the lower portion of the chute and the operating mechanism for the movable bottom sections thereof.

After the rollers 49 have been adjusted to support a pallet 54 in proper position within the form or mold to support a layer of material about one-half of the thickness of the slab to be formed, and after the pallet has been placed in the mold upon said rollers 49, the carriage is moved along the track 18 under the lower end of the chute 63 containing the aggregate or concrete supplied thereto from a hopper 64. The chute 63 and hopper 64 are supported by a rigid open frame 65 through which the carriage moves. The opening through the lower end of the chute 63 has the same shape and area as the form or mold on the carriage, so that all of the aggregate or concrete passing from the chute will enter the mold. A bar 66 is rigidly attached to each side of the frame 65 below the lower end of the chute 63. The device for opening and closing the bottom of the chute comprises a pair of plates 67 (Fig. 3) having their inner edges beveled upwardly to form relatively sharp edges 68 which are in contact when they are in closed position. The ends of these plates are supported for sliding movements on the bars 66. The outer edges of said plates 67 extend beyond the walls of the chute 63 and are attached to transverse bars 69 which have brackets 70 attached thereto intermediate of their ends and provided with rollers 70' operating on angular tracks 71 (Figs. 2 and 8). A number of guides 72 extend through holes in the bars 69 and through the walls of the chute 63, the guides 72 at each side of the chute being staggered with relation to the guides at the opposite side of the chute, as clearly shown in Fig. 1. These guides may be of tubular form, as indicated in the drawing. To the inner ends of the respective guides 72, ends of vertical blades 73 are attached, the opposite ends of said blades 73 being attached to the opposite wall of the chute. Therefore, these blades 73 extend across the chute in vertical planes and provide spaces between which the aggregate or concrete passes from the chute into the form or mold. These plates separate the aggregate or concrete so that it will flow more freely in the mold and adjust itself to proper thickness.

The bars 69 are movable laterally along the guides 72 and move the plates 67 to open and to closed positions. A bail crank 74 has its ends mounted on pivots 75 supported by the bars 66. A lever 76 is attached to each end of the crank 74 and the opposite ends of said lever are pivotally connected by links 77 with the ends of the respective bars 69 so that when the crank 74 is moved downwardly, the bars 69 will be moved along the guides 72. This moves the bottom plates 67 of the chute 63 laterally away from each other to open the lower end of the chute and permit the aggregate or concrete to pass into the form or mold. As before indicated, the ends of the plates 67 are supported by the bars 66 and are thereby held from distortion. After the concrete has filled the mold upon and above the pallet 54, the crank 74 is operated to move the plates 67 to closed position, such movement being facilitated by the sharp edges 68 of said plates which cut through the aggregate or concrete at the top of the mold. The lower surfaces of the plates 67 operate against the aggregate or concrete within the mold in the manner of trowels, and tend to effect even distribution and density of the material within the mold.

After the first charge of material has been delivered into the mold in this manner, the carriage is moved outwardly to its starting position and the crank 39 is operated to lower the rollers 49, the pallet 54 thereon, and the material contained in the mold, so that the upper surface of said material is below the upper surface of the mold a distance approximately equal to the thickness of the material contained in the mold. Then, a reinforcement, in the form of woven wire or other preferred form, is placed in the mold upon the material contained therein. Then the carriage is again moved to position under the chute 63 and another charge of the aggregate or concrete is delivered into the mold by operating the crank 74 in the manner before described to open and to close the lower end of the chute 63.

After the mold has been filled in this manner with the aggregate or concrete and the reinforcement therefor, the carriage is moved beyond the chute to a mechanism which is operative to press the material within the mold and into and through the openings between the parts of the reinforcement so that a reinforced slab is formed of approximately uniform density and thickness throughout and with smooth surfaces. This mechanism may be designated as a press and is supported by a rigid frame 78 through which the track provided by the rails 18 extends.

The press comprises a plate 79 attached to the lower edges of horizontal strengthening and supporting bars 80 for upward and downward movements thereby. Brackets 81 are attached to the upper edges of each of the bars 80. Above each bar 80 a shaft 82 is mounted in bearings 83 rigid with the frame 78. A sleeve 84 is mounted on each shaft 82 and has a depending portion 85 supporting a horizontal rod 86. Links 87 have their lower ends pivoted to the rods 86 and cooperating with the parts 85 extending from the sleeves 84 to provide toggle devices for raising and lowering the plate 79. Connecting rods 88 have their outer ends pivoted to the depending parts 85 of the toggle devices (Fig. 9) and their inner ends pivoted to cranks 89 on a shaft 90 journalled in rigid bearings 91. The shaft 90 is rotated by appropriate speed reducing gearing 91 of known construction driven by an electric motor 92 supported by the frame 65 and controlled by familiar switch arrangement (not shown), so that said motor may be started and stopped as desired.

Figure 9:
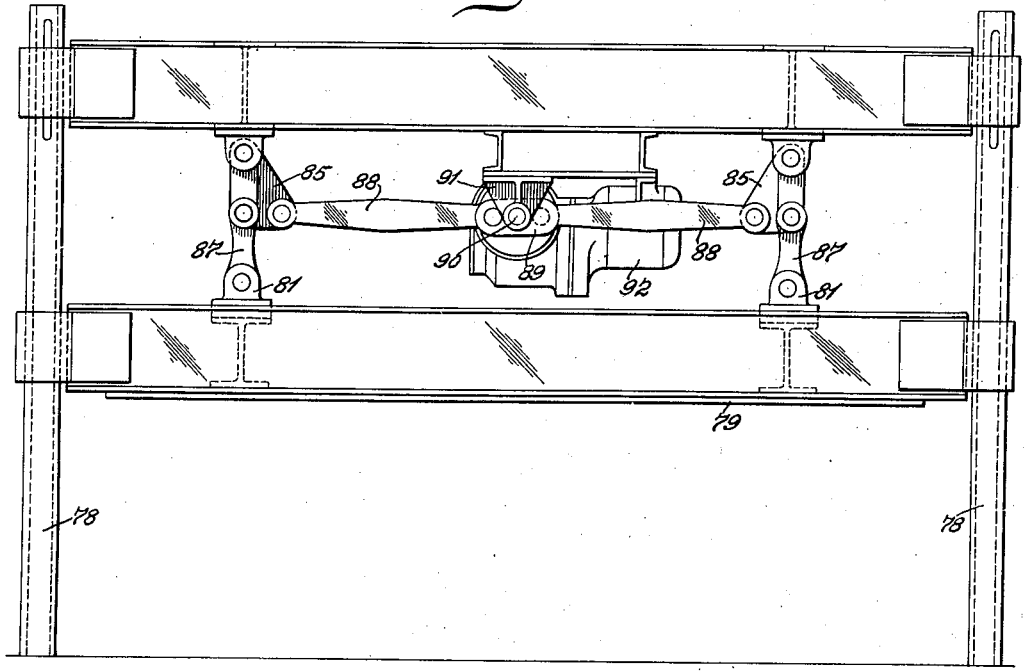
Fig. 9 is an enlarged elevation of a portion of the press by which the concrete is compressed within the form or mold.

In the arrangement shown in Fig. 9, the plate 79 is in its lowest position and, when the motor 92 is operated to rotate the shaft 90, the toggles 85, 87 are broken and the plate is raised to permit the carriage and the mold to be moved thereunder. When the mold is in proper position under the plate 79, the press may be operated to compress the material within the mold in order to form a slab of approximately uniform thickness and density throughout and with smooth surfaces. When the plate 79 is raised, the carriage may be moved beyond the press to the dotted line position shown in Fig. 1. Then the crank device 39, 40, may be operated to raise the rollers 49 and the pallet 54 thereon to a sufficient height to permit the pallet to be rolled laterally along the rollers 49 onto rollers 93 in a conveyor frame 94. This conveyor frame 94 supports series of horizontal rollers 95 by which the pallet may be moved easily. The concrete slabs are permitted to remain on the pallets until they harden and set, after which they are removed from the pallets so that the latter may be used repeatedly.

In using my improved mechanism for making concrete slabs, the carriage is moved along the track provided by the rails 18 to a position in which a pallet 54 may be moved along the rollers 56 into the form or mold and onto the rollers 49. The rollers 49 are adjusted by operation of the toggles 31, 34, by the crank device 39, 40 in position to support the pallet 54 within the form or mold so that a slab of desired thickness can be made. Then the carriage is moved along the track to position under the chute 63 and may be located rigidly in said position by raising the wheels 6 and lowering the rigid carriage frame onto the rails 18. The form or mold is then filled with a charge of concrete and the carriage is moved from under the chute approximately to its starting position and the reinforcement is placed upon the concrete contained in the form or mold. Then the crank 39, 40 is again operated to lower the rollers 49 and the pallet 54 thereon within the form or mold so that an additional charge of concrete may be placed therein. Next, the plates 67 are moved to open position and an additional charge of concrete is placed in the mold upon the reinforcement therein, after which the plates 67 are closed and the carriage is moved along the rails 18 to the press. To facilitate such movement, the rigid carriage frame may be lowered slightly out of contact with any of the press parts but without engaging the rails 18, leaving the wheels 6 free to roll along said rails. After the carriage is placed in position under the press, the form or mold may again be raised or lowered as desired. When the motor 92 is operated, the plate 79 is raised and lowered to compress the concrete within the form or mold and form a reinforced slab of approximately uniform thickness and density throughout and with smooth surfaces. After the concrete has been compressed and provided with smooth surfaces within the mold, the carriage is moved beyond the press to position for discharge of the pallet and the slab onto the rollers 93. The pallet and the supported slab may then be moved along the rollers 95 to a place in which the molded concrete is permitted to harden and set.

It is now apparent that this invention attains all of its intended objects and purposes in a highly efficient, economical and satisfactory manner. The mechanisms may be varied as widely as the scope of equivalent limits will permit without departure from the nature and principle of the invention as defined by the appended claims.

I claim:

1. Mechanism for forming concrete slabs comprising side and end walls forming a mold enclosure, a frame supporting said walls, a plate mounted in said enclosure, links forming pivotal connection between said plate and said frame for supporting said plate in said enclosure, means for operating said links to move said plate to different vertical positions in said enclosure, a pallet adapted to be removably supported above said plate within said enclosure, and a series of rollers for supporting said pallet above said plate within said enclosure.

2. Mechanism for forming concrete slabs comprising a mold, a frame for supporting and moving said mold, a series of vertically movable rollers mounted in said mold, a pallet arranged to fit within said mold and seat upon said rollers, mechanism supported by said frame for raising and lowering said rollers within said mold to support said pallet at selected distances from the top of said mold to form slabs of different thicknesses, and means for delivering concrete into all parts of said mold at the same time.

3. Mechanism for forming concrete slabs of selected thicknesses comprising a frame, a mold supported by said frame, a pallet insertable in said mold to provide a bottom therefor and being withdrawable from said mold, a plurality of rollers, and levers supported by said frame for supporting said rollers and thereby said pallet in said mold at different selected distances from the top of said mold to form slabs of different thicknesses.

4. Mechanism for forming concrete slabs of selected thicknesses comprising a frame, a mold supported by said frame, a pallet insertable in said mold to provide a bottom therefor and being withdrawable from said mold, a plurality of rollers, levers supported by said frame for supporting said rollers and thereby said pallet in said mold at selected distances from the top of said mold to form slabs of different thicknesses, and connections for operating said mechanism to move said pallet toward the top of said mold and leaving said pallet free for lateral movement therefrom.

5. In mechanism for forming concrete slabs of selected thicknesses, a frame, a mold supported by said frame, a pallet insertable in said mold to provide a bottom therefor and being withdrawable from said frame to move a molded slab therefrom, a plurality of rollers, devices supported by said frame for holding said rollers and thereby said pallet in said mold at selected distances from the top of said mold to form slabs of different thicknesses, and mechanism for operating said devices simultaneously to move said pallet to a position for lateral withdrawal from said mold to carry a molded slab therefrom.

6. In mechanism for forming concrete slabs of selected thicknesses, a supporting frame, side and end walls supported by said frame and forming a mold, a pallet forming the bottom of said mold, a series of rollers for supporting said pallet within said mold, and mechanism for simultaneously moving said rollers vertically within said mold to support said pallet in different vertical positions, as desired.

7. In mechanism for forming concrete slabs of selected thicknesses, a supporting frame, side and end walls supported by said frame and forming a mold, a pallet forming the bottom of said mold, a series of elements for supporting said pallet within said mold, mechanism for simultaneously moving said elements vertically within said mold to support said pallet different distances from the upper edges of said walls to form concrete slabs of different selected thicknesses as desired, and mechanism mounted on said frame for moving said mold and said pallet vertically to different heights while said pallet remains stationary relative to said mold.

8. In mechanism for forming concrete slabs of selected thicknesses, a supporting frame, side and end walls supported by said frame and forming a mold, mechanism mounted on said frame for moving said mold vertically to different heights as desired, a series of supports, a pallet carried by said supports and forming the bottom of the mold, and mechanism for simultaneously moving said supports vertically relative to the mold in any of the adjusted positions of said mold to support said pallet in different vertical positions to form slabs of selected thicknesses, as desired.

ANDREW F. HOWE.